US012583519B2

(12) United States Patent
Miura

(10) Patent No.: US 12,583,519 B2
(45) Date of Patent: Mar. 24, 2026

(54) VEHICLE BODY FRAME STRUCTURE

(71) Applicant: SUBARU CORPORATION, Tokyo (JP)

(72) Inventor: Hikaru Miura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 287 days.

(21) Appl. No.: 18/369,017

(22) Filed: Sep. 15, 2023

(65) Prior Publication Data

US 2024/0109587 A1 Apr. 4, 2024

(30) Foreign Application Priority Data

Oct. 4, 2022 (JP) ................................. 2022-160613

(51) Int. Cl.
| | |
|---|---|
| B62D 21/03 | (2006.01) |
| B60K 1/04 | (2019.01) |
| B62D 25/02 | (2006.01) |
| B62D 27/02 | (2006.01) |

(52) U.S. Cl.
CPC ................ B62D 21/03 (2013.01); B60K 1/04 (2013.01); B62D 25/025 (2013.01); *B60K 2001/0438* (2013.01); *B62D 27/023* (2013.01)

(58) Field of Classification Search
CPC ........ B62D 21/00; B62D 21/02; B62D 21/03; B62D 21/05; B62D 25/025; B60K 2001/0438; B60K 1/04
USPC .......................................... 296/209; 280/781
See application file for complete search history.

(56) References Cited

U.S. PATENT DOCUMENTS

| | | | | | |
|---|---|---|---|---|---|
| 4,557,519 | A | * | 12/1985 | Matsuura ........... | B62D 25/2027 296/187.11 |
| 5,085,484 | A | * | 2/1992 | Mori .................... | B62D 25/088 296/203.03 |
| 7,025,412 | B2 | * | 4/2006 | Nakamura ......... | B62D 25/2036 296/193.07 |
| 2017/0088189 | A1 | * | 3/2017 | Saeki .................... | B62D 21/03 |

FOREIGN PATENT DOCUMENTS

| | | |
|---|---|---|
| JP | 2001-247057 | 9/2001 |
| JP | 2008-230417 | * 10/2008 |

* cited by examiner

*Primary Examiner* — Joseph D. Pape
(74) *Attorney, Agent, or Firm* — McGinn IP Law Group, PLLC

(57) ABSTRACT

A vehicle body frame structure includes side sill front pieces, side sill rear pieces, front side frames and rear side frames. The front side frames extend in a vehicle longitudinal direction from respective vehicle-frontward ends of the side sill front pieces, and are provided on vehicle-widthwise either side and vehicle-widthwise inwardly of the side sill front pieces. The side sill front pieces and the side sill rear pieces are coupled linearly at first couplings while extending in the vehicle longitudinal direction. The front side frames and the rear side frames are coupled linearly at second couplings while extending in the vehicle longitudinal direction. The second couplings are provided vehicle-rearwardly of the first couplings. The front side frames are coupled, at the first couplings, to the side sill front pieces and the side sill rear pieces, to overlap with the side sill front pieces and the side sill rear pieces.

3 Claims, 6 Drawing Sheets

VEHICLE BODY FRAME STRUCTURE

CROSS-REFERENCE TO RELATED APPLICATIONS

The present application claims priority from Japanese Patent Application No. 2022-160613 filed on Oct. 4, 2022, the entire contents of which are hereby incorporated by reference.

BACKGROUND

The disclosure relates to a vehicle body frame structure.

In general, in a lower part of a vehicle such as an automobile, a vehicle body frame structure is provided. The vehicle body frame structure enhances rigidity of a vehicle body. Providing the vehicle body frame structure leads to suppression of a traveling noise and reduction in influences in case of collision.

As a vehicle travels, loads in a torsional direction, a vehicle vertical direction, etc. are transmitted to the vehicle body frame structure from wheels, etc. Moreover, in case of collision, a large collision load is transmitted to the vehicle body frame structure. Thus, to enhance, for example, operation stability, riding comfort, and safety of the vehicle, what is desired for the vehicle body frame structure is to be rigid enough to withstand large loads to be applied to the frame.

To enhance the rigidity of the vehicle body frame structure, continuity of the frame structure is important. For example, it is conceivable to unitize a main frame, side sills, and rear side frames. In some cases, however, it is necessary to separately provide the main frame, the side sills, and the rear side frames because of restrictions on an installation layout in the vehicle and productivity of the components, and to provide stiffening members that supplement the rigidity.

For example, in Japanese Unexamined Patent Application Publication (JP-A) No. 2001-247057, rear portions of front side members on vehicle-widthwise either side are bent vehicle-rearward outwardly, and are coupled to vehicle-frontward inner sidewalls of vehicle-widthwise outer rocker rails, i.e., side sills. Moreover, front portions of rear side members on vehicle-widthwise either side are bent vehicle-frontward outwardly, and are coupled to vehicle-rearward inner sidewalls of the side sills. In addition, a technique for enhancement of the rigidity of the vehicle body is disclosed in which extensions as stiffening members are provided along the vehicle-widthwise inner sidewalls of the vehicle-widthwise outer side sills. For example, reference is made to JP-A No. 2001-247057.

SUMMARY

An aspect of the disclosure provides a vehicle body frame structure for a vehicle. The vehicle body frame structure includes side sill front pieces, side sill rear pieces, front side frames, and rear side frames. The side sill front pieces extend in a vehicle longitudinal direction of the vehicle and are provided on vehicle-widthwise either side of a bottom of the vehicle. The side sill rear pieces extend in the vehicle longitudinal direction. Vehicle-frontward ends of the side sill rear pieces are coupled to respective vehicle-rearward ends of the side sill front pieces. The front side frames extend in the vehicle longitudinal direction from respective vehicle-frontward ends of the side sill front pieces, and are provided on vehicle-widthwise either side and vehicle-widthwise inwardly of the side sill front pieces. The rear side frames extend in the vehicle longitudinal direction. Vehicle-frontward ends of the rear side frames are coupled to respective vehicle-rearward ends of the front side frames. The side sill front pieces and the side sill rear pieces are coupled linearly at first couplings while extending in the vehicle longitudinal direction. The front side frames and the rear side frames are coupled linearly at second couplings while extending in the vehicle longitudinal direction. The second couplings are provided rearward of the first couplings in the vehicle longitudinal direction. The front side frames are coupled, at the first couplings, to the side sill front pieces and the side sill rear pieces, to overlap with the side sill front pieces and the side sill rear pieces.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
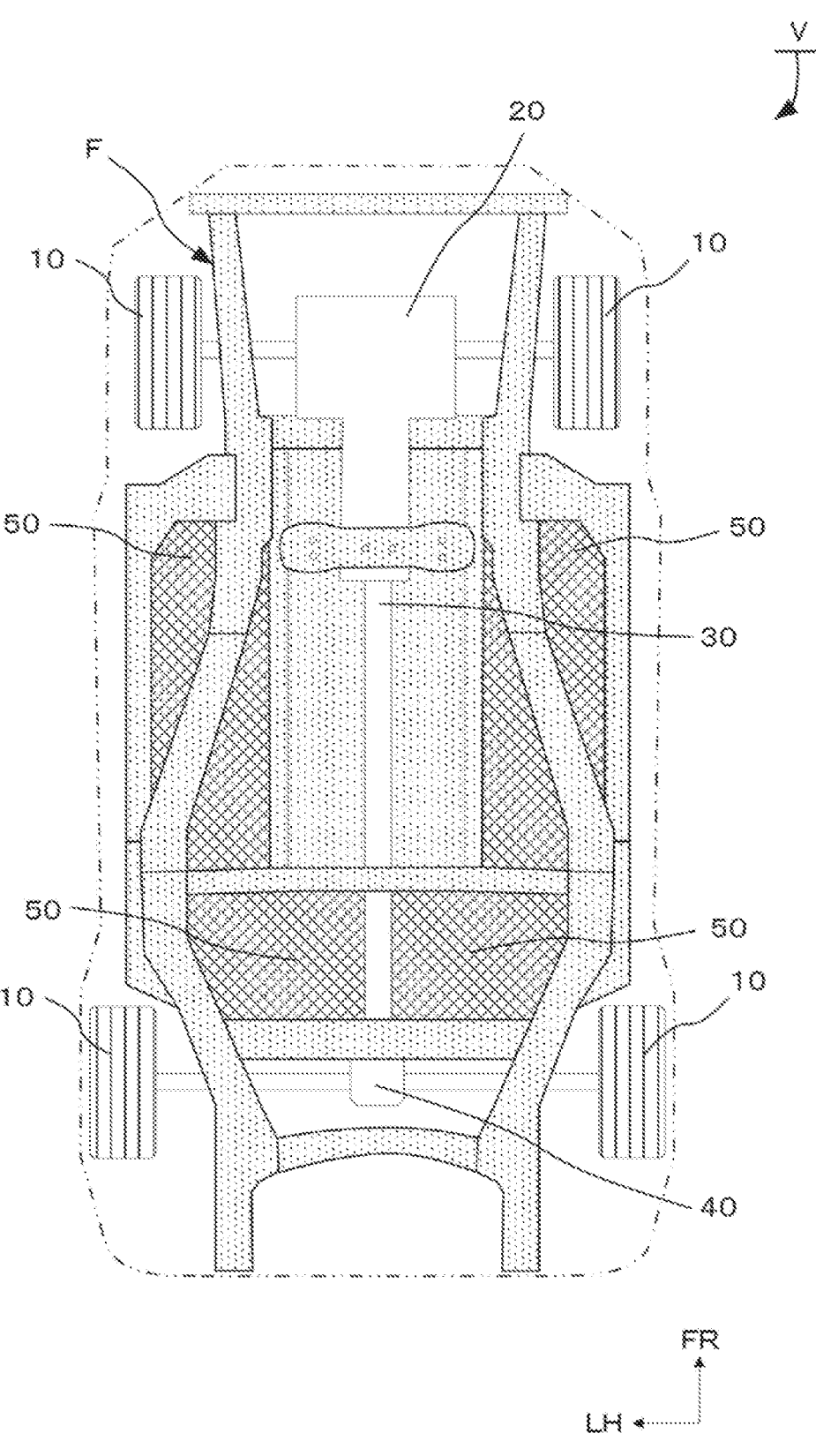
FIG. 1 is a diagram of a configuration of a vehicle according to an embodiment of the disclosure, as viewed from below.

The technique described in JP-A No. 2001-247057 has a concern about a decrease in a vehicle-widthwise inner underfloor space because of the provision of the extensions. There is also possibility that loads may concentrate on joints between the front side members and the rear side members, and the extensions.

It is desirable to provide a vehicle body frame structure that makes it possible to enhance rigidity of a vehicle body while providing an adequate underfloor space.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

With reference to FIGS. 1 to 6, description is given below of a vehicle V to which a vehicle body frame structure F according to an embodiment of the disclosure is applied. It is to be noted that the arrows FR illustrated as appropriate in the figures indicate the front of the vehicle V illustrated in FIG. 1. The arrows UP indicate an upward direction as viewed from the front, and the arrows LH indicate a leftward direction as viewed from the front. In the following description, vertical, longitudinal, and horizontal directions respectively denote a vertical direction as viewed from the front, a longitudinal direction as viewed from the front, and a horizontal direction as viewed from the front, unless otherwise specified.

Embodiment

With reference to FIGS. 1 to 6, description is given of a configuration of the vehicle body frame structure F according to this embodiment provided in the vehicle V.

<Configuration of Vehicle V>

The vehicle V may be, for example, an automobile including a power unit 20. In the power unit 20, an internal combustion engine or an electric motor is disposed as a driving source. It is to be noted that the vehicle V may be, for example, a hybrid electric vehicle including an engine and an electric motor as multiple driving sources.

As illustrated in FIG. 1, the vehicle V may include wheels 10, the power unit 20, a propeller shaft 30, a differential gear unit 40, a floor panel unit 50, and the vehicle body frame structure F. In FIG. 1, the floor panel unit 50 is represented by double cross-hatching, and the vehicle body frame structure F is represented by stippling.

The power unit 20 may be a driving device that drives the wheels 10 and include, for example, an unillustrated internal combustion engine or a motor, a transmission, a clutch, and a drive shaft. The power unit 20 may be disposed, for example, in a front part of the vehicle and supported by the vehicle body frame structure F.

The propeller shaft 30 may extend in a vehicle longitudinal direction. The propeller shaft 30 may transmit a driving force transmitted from the power unit 20, to the wheels 10 in a rear part of the vehicle. A vehicle-frontward end of the propeller shaft 30 may be coupled to the power unit 20. A vehicle-rearward end of the propeller shaft 30 may be coupled to the differential gear unit 40.

The differential gear unit 40 may be coupled to the vehicle-rearward end of the propeller shaft 30. The differential gear unit 40 may transmit the driving force transmitted from the power unit 20 through the propeller shaft 30, to the wheels 10 in the rear part of the vehicle, and absorb a difference in rotational speed between the left and right wheels 10 in the rear part of the vehicle.

The floor panel unit 50 may be a floor member provided in a lower part of the vehicle. The floor panel unit 50 may include, for example, a steel plate that separates an unillustrated cabin from an outside of the vehicle. The outside of the vehicle includes the vehicle body frame structure F. In the cabin, for example, an occupant is seated. The floor panel unit 50 may be disposed in the vehicle longitudinal direction and a vehicle widthwise direction.

<Configuration of Vehicle Body Frame Structure F>

Figure 2:
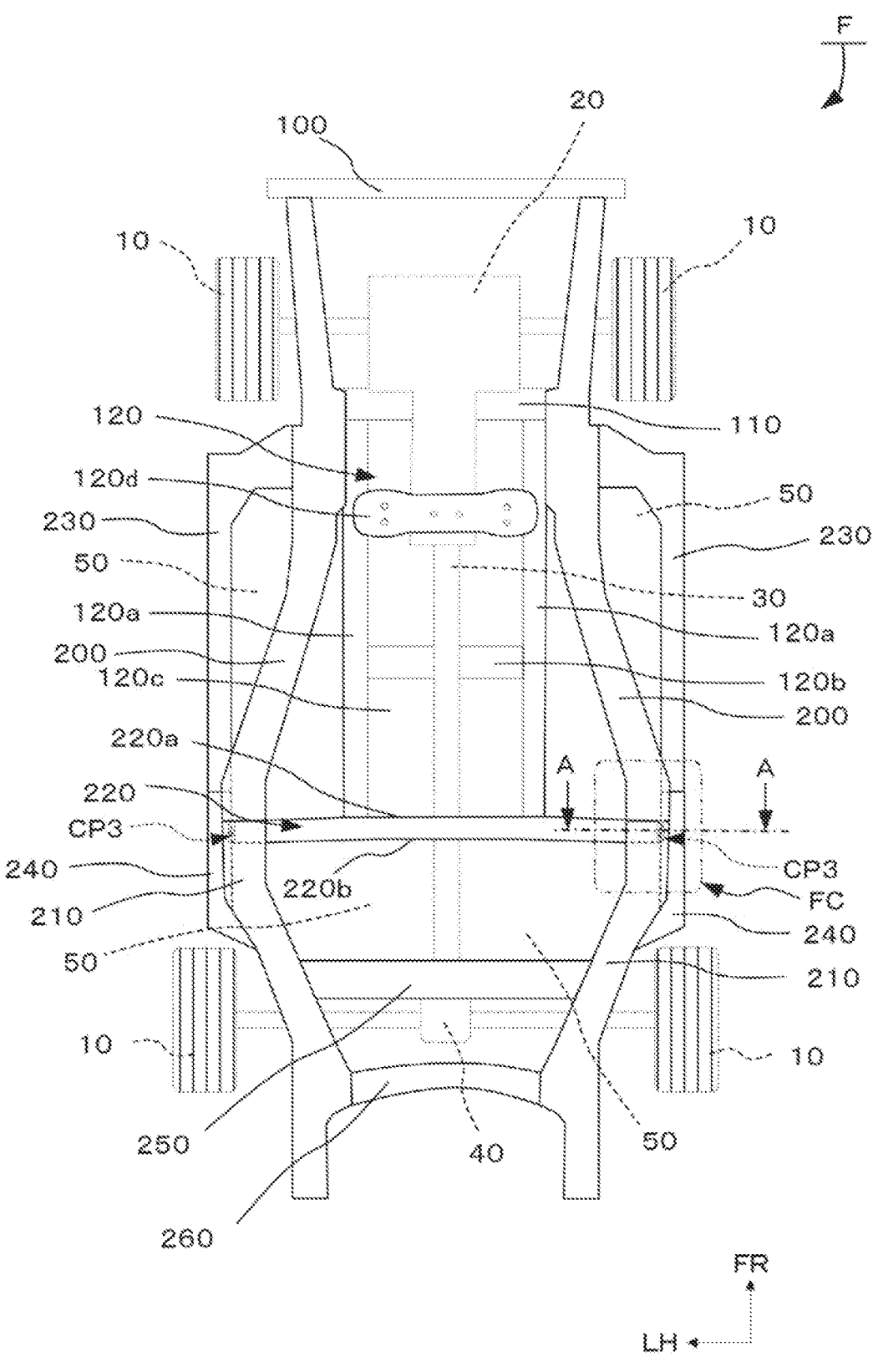
FIG. 2 is a diagram of a configuration of a vehicle body frame structure illustrated in FIG. 1, as viewed from below.

As illustrated in FIG. 2, the vehicle body frame structure F may include, for example, a bumper beam 100, a torque box 110, a floor tunnel 120, front side frames 200, rear side frames 210, a crossing member 220, side sill front pieces 230, side sill rear pieces 240, and rear crossing members 250 and 260.

(Bumper Beam 100)

The bumper beam 100 may be disposed in the front part of the vehicle and extend in the vehicle widthwise direction. The bumper beam 100 may constitute a frame in the front part of the vehicle. The bumper beam 100 may include, for example, a metal, and have a substantially rectangular closed cross-sectional shape. The bumper beam 100 may be coupled by, for example, welding to vehicle-frontward ends of the front side frames 200 disposed on vehicle-widthwise either side.

(Torque Box 110)

The torque box 110 may be a frame disposed on a bottom of the vehicle V and extending in the vehicle widthwise direction. The torque box 110 may be disposed rearward of the power unit 20 in the vehicle longitudinal direction and extend in the vehicle widthwise direction. Vehicle-widthwise ends of the torque box 110 may be coupled to the respective front side frames 200 by, for example, welding. The torque box 110 may include, for example, a metal having high rigidity and have a substantially rectangular closed cross-sectional shape.

(Floor Tunnel 120)

The floor tunnel 120 may be disposed in a bottom part of the vehicle and have a substantially inverted U shape, with its lower side open. The floor tunnel 120 may protrude vehicle-upwardly into inside the cabin. The floor tunnel 120 may extend in the vehicle longitudinal direction along a centerline of the vehicle. The floor tunnel 120 may accommodate, for example, a vehicle-rearward portion of the power unit 20 and the propeller shaft 30.

The floor tunnel 120 may be a frame along the centerline of the vehicle, and include, for example, tunnel side frames 120a, a tunnel cross-piece 120b, a tunnel floor 120c, and a floor cross-piece 120d. The tunnel side frames 120a may include, for example, a metal having high rigidity and have a substantially rectangular closed cross-sectional shape. Vehicle-frontward ends of the tunnel side frames 120a may be coupled to the front side frames 200 and the torque box 110 by, for example, welding. Vehicle-rearward ends of the tunnel side frames 120a may be coupled to the crossing member 220 described later by, for example, welding. The tunnel cross-piece 120b may have a substantially U shape. Vehicle-widthwise ends of the tunnel cross-piece 120b may be coupled to the respective tunnel side frames 120a by, for example, welding. The tunnel floor 120c may be a wall member including, for example, a steel plate having the substantially U shape of the floor tunnel 120. The tunnel floor 120c may extend in the vehicle longitudinal direction along the centerline of the vehicle. Vehicle-widthwise sides of the tunnel floor 120c may be coupled to the tunnel side frames 120a by, for example, welding. Vehicle-widthwise ends of the floor cross-piece 120d may be fixed to vehicle-downward sides of the tunnel side frames 120a by, for example, bolts. The vehicle-rearward portion of the power unit 20 may be placed on and fixed to an vehicle-upward side of the floor cross-piece 120d.

(Front Side Frames 200)

The front side frames 200 may be provided in a pair on vehicle-widthwise either side of the front part of the vehicle. The front side frames 200 may be disposed vehicle-widthwise outwardly of the power unit 20 that drives the vehicle V, and extend in the vehicle longitudinal direction. The front side frames 200 may include, for example, a metal having high rigidity and have a substantially rectangular closed cross-sectional shape.

Between the front side frames 200 disposed on vehicle-widthwise either side, the bumper beam 100, the torque box 110, and the crossing member 220 may be provided. Between the front side frames 200 disposed on vehicle-widthwise either side, vehicle-widthwise ends of the bumper beam 100 may be coupled to the vehicle-frontward ends of the front side frames 200. The vehicle-widthwise ends of the torque box 110 may be coupled to the front side frames 200 rearward of the power unit 20 in the vehicle longitudinal direction. Vehicle-widthwise ends of the crossing member 220 may be coupled to vehicle-longitudinally middle portions of the front side frames 200. The front side frames 200 may constitute a main frame of the vehicle body frame structure F from the front part of the vehicle to a longitudinally middle part of the vehicle.

Moreover, to vehicle-rearward ends of the front side frames 200, the rear side frames 210 described later are coupled. At frame couplings FC described later at which the front side frames 200 and the rear side frames 210 are coupled, the front side frames 200 and the rear side frames 210 may be provided linearly in the vehicle longitudinal direction.

(Rear Side Frames 210)

The rear side frames 210 may be provided in a pair on vehicle-widthwise either side of the rear part of the vehicle. The rear side frames 210 may be disposed rearward of the front side frames 200 in the vehicle longitudinal direction and extend in the vehicle longitudinal direction. The rear side frames 210 may include, for example, a metal having high rigidity and have a substantially rectangular closed cross-sectional shape. To vehicle-frontward ends of the rear side frames 210, the vehicle-rearward ends of the front side frames 200 are coupled linearly.

Between the rear side frames 210 disposed on vehicle-widthwise either side, the rear crossing members 250 and 260 may be provided. The vehicle-frontward ends of the rear side frames 210 may be coupled to the frame couplings FC described later. To vehicle-rearward portions of the rear side frames 210, vehicle-widthwise ends of the rear crossing members 250 and 260 may be coupled. The rear side frames 210 may constitute a main frame of the vehicle body frame structure F rearward of the longitudinally middle part of the vehicle in the vehicle longitudinal direction.

(Crossing Member 220)

The crossing member 220 may be disposed in the longitudinally middle part of the vehicle and extend in the vehicle widthwise direction. Both ends of the crossing member 220 may be coupled by, for example, welding at couplings CP3 to the side sill rear pieces 240 disposed on vehicle-widthwise either side. In one embodiment of the disclosure, the couplings CP3 may serve as "third couplings". The crossing member 220 may include, for example, a metal. The crossing member 220 may have a substantially rectangular closed cross-sectional shape by coupling between a crossing member front piece 220a and a crossing member rear piece 220b. The crossing member front piece 220a constitutes a vehicle-frontward portion of the crossing member 220. The crossing member rear piece 220b constitutes a vehicle-rearward portion of the crossing member 220.

(Side Sill Front Pieces 230 and Side Sill Rear Pieces 240)

Figure 3:
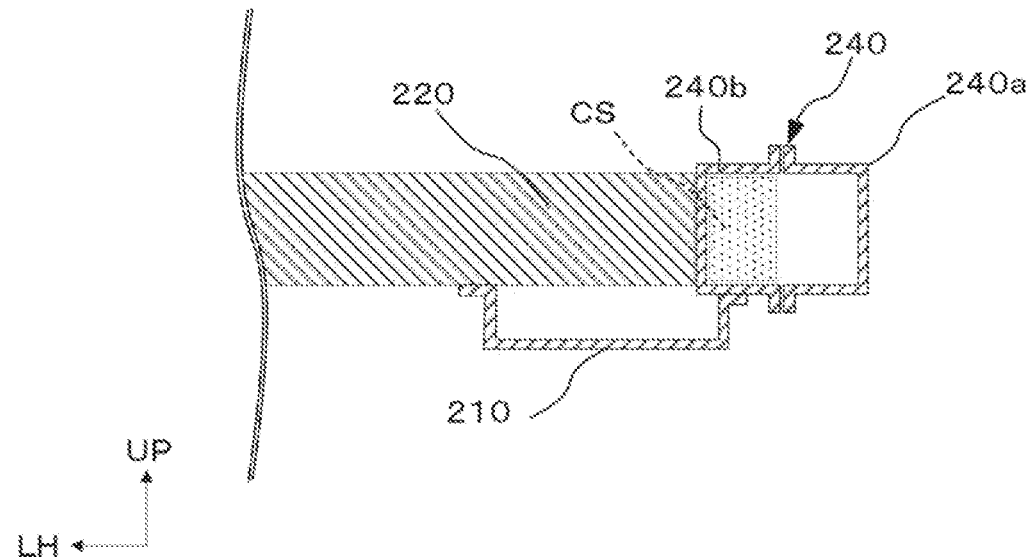
FIG. 3 is a cross-sectional view taken along a line A-A in FIG. 2, looking in a direction of the appended arrows A.

The side sill front pieces 230 and the side sill rear pieces 240 may be a frame provided on vehicle-widthwise either side of the bottom of the vehicle and extending in the vehicle longitudinal direction. The side sill front pieces 230 and the side sill rear pieces 240 may include, for example, a metal having high rigidity. As illustrated in FIG. 3, the side sill rear pieces 240 may each have a substantially rectangular closed cross-sectional shape by coupling between a side sill rear sub-piece 240a and a side sill rear sub-piece 240b. The side sill rear sub-piece 240a constitutes a vehicle-widthwise outer side of the side sill rear piece 240. The side sill rear sub-piece 240b constitutes a vehicle-widthwise inner side of the side sill rear piece 240. As with the side sill rear pieces 240, the side sill front pieces 230 may each have a substantially rectangular closed cross-sectional shape by coupling between a side sill front sub-piece 230a and a side sill front sub-piece 230b.

Moreover, inside the side sill rear piece 240, a coupling separator CS may be disposed at the coupling CP3 at which the crossing member 220 and the side sill rear piece 240 are coupled. The coupling separator CS may be a lightweight stiffening member including, for example, a steel plate. The coupling separator CS may be coupled to the rear side frame 210, the crossing member 220, and the side sill rear piece 240.

(Rear Crossing Members 250 and 260)

The rear crossing members 250 and 260 may be disposed in the rear part of the vehicle and extend in the vehicle widthwise direction. Ends of the rear crossing members 250 and 260 may be coupled by, for example, welding to the rear side frames 210 disposed on vehicle-widthwise either side. The rear crossing members 250 and 260 may include, for example, a metal and have a substantially rectangular closed cross-sectional shape.

In the vehicle body frame structure F, at the frame couplings FC, a frame structure of the front part of the vehicle and a frame structure of the rear part of the vehicle may be coupled. The frame couplings FC may be disposed on vehicle-widthwise either side of the longitudinally middle part of the vehicle.

(Frame Couplings FC)

At the frame couplings FC, the main frames of the vehicle body frame structure F may meet and be coupled together.

Figure 4:
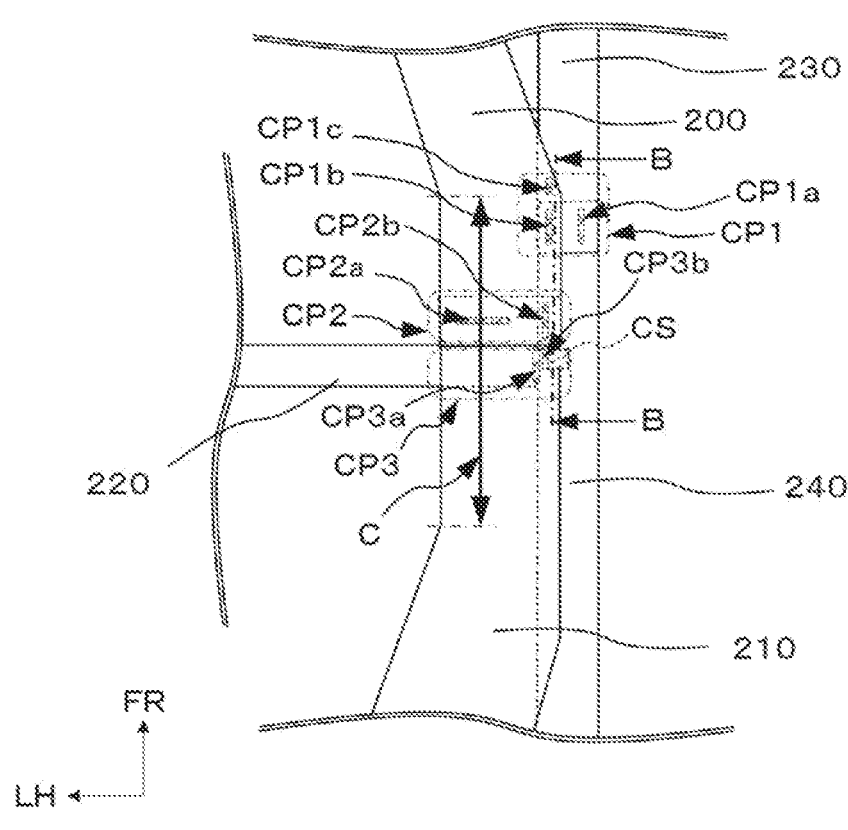
FIG. 4 is an enlarged diagram of a configuration of an FC illustrated in FIG. 2, as viewed from below.

As illustrated in FIG. 4, at the frame couplings FC, the front side frames 200, the rear side frames 210, the crossing member 220, the side sill front pieces 230, and the side sill rear pieces 240 may be coupled.

The side sill front pieces 230 and the side sill rear pieces 240 may be coupled by, for example, welding at the couplings CP1. In one embodiment of the disclosure, the couplings CP1 may serve as "first couplings". At each of the couplings CP1, for example, a coupling CP1a, a coupling CP1b, and a coupling CP1c may be provided as couplings. In one embodiment of the disclosure, the couplings CP1b may serve as "fourth couplings". Moreover, at the couplings CP1, the front side frames 200 are coupled to the side sill front pieces 230 and the side sill rear pieces 240, to overlap with the side sill front pieces 230 and the side sill rear pieces 240.

Figure 5:
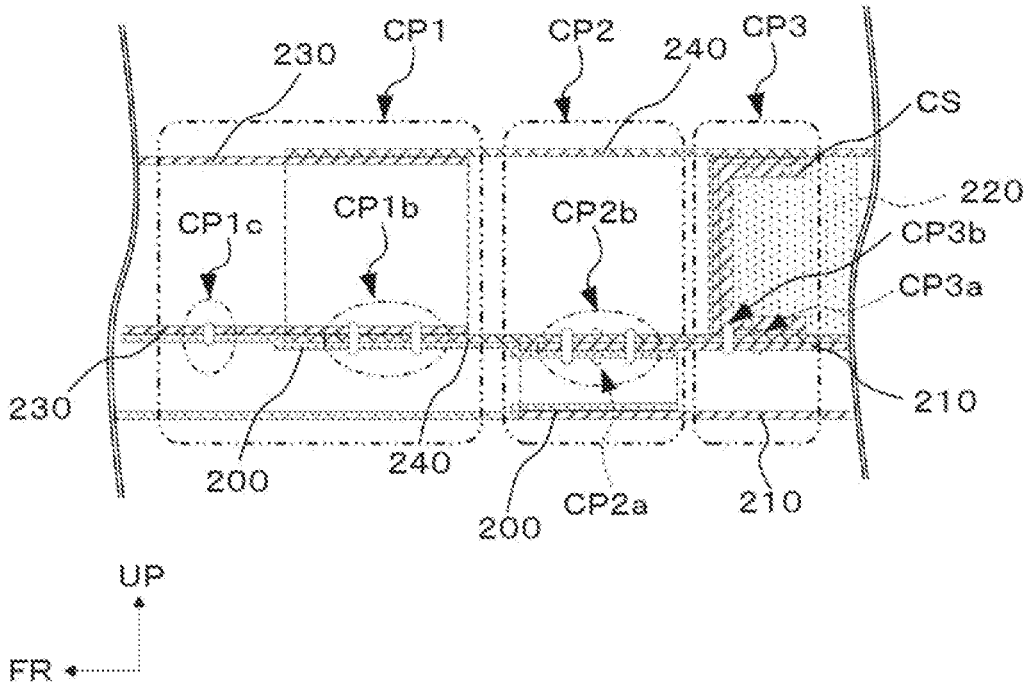
FIG. 5 is a cross-sectional view taken along a line B-B in FIG. 4, looking in a direction of the appended arrows B.

At the couplings CP1a, the side sill front pieces 230 and the side sill rear pieces 240 may be coupled by, for example, welding in a two-layer stack. Moreover, as illustrated in FIG. 5, at the couplings CP1b, the front side frames 200, the side sill front pieces 230, and the side sill rear pieces 240 may be coupled by, for example, welding in a three-layer stack. The front side frames 200 may be coupled to vehicle-downward sides of the side sill front pieces 230 and the side sill rear pieces 240, to overlap with the side sill front pieces 230 and the side sill rear pieces 240. At the couplings CP1c, the front side frames 200 and the side sill front pieces 230 may be coupled by, for example, welding in a two-layer stack.

As illustrated in FIG. 4, the front side frames 200 and the rear side frames 210 may be coupled by, for example, welding at couplings CP2. In one embodiment of the disclosure, the couplings CP2 may serve as "second couplings". At each of the couplings CP2, for example, a coupling CP2*a* and a coupling CP2*b* may be provided as couplings. In one embodiment of the disclosure, the couplings CP2*b* may serve as "fifth couplings".

As illustrated in FIG. 5, at the couplings CP2*a*, the front side frames 200 and the rear side frames 210 may be coupled by, for example, welding in a two-layer stack. At the couplings CP2*b*, the front side frames 200, the rear side frames 210, and the side sill rear pieces 240 may be coupled by, for example, welding in a three-layer stack. The front side frames 200 may be coupled to vehicle-downward sides of the side sill rear pieces 240, to overlap with the side sill rear pieces 240.

The front side frames 200 and the rear side frames 210 may be provided linearly in a segment denoted by an arrow C in FIG. 4.

The couplings CP2 are provided rearwardly of the couplings CP1 in the vehicle longitudinal direction.

As illustrated in FIG. 4, the crossing member 220 and the side sill rear pieces 240 may be coupled by, for example, welding at couplings CP3. In one embodiment of the disclosure, the couplings CP3 may serve as "third couplings". At each of the couplings CP3, for example, a coupling CP3*a* and a coupling CP3*b* may be provided as couplings. In one embodiment of the disclosure, the couplings CP3*b* may serve as "sixth couplings".

As illustrated in FIG. 5, at the couplings CP3*a*, the crossing member 220 and the side sill rear pieces 240 may be coupled by, for example, welding in a two-layer stack. At the couplings CP3*b*, the rear side frames 210, the side sill rear pieces 240, and the coupling separators CS disposed inside the side sill rear pieces 240 may be coupled in a three-layer stack. Moreover, the crossing member 220 and the coupling separators CS may be coupled to the side sill rear pieces 240 in a three-layer stack, with a vehicle-widthwise inner wall member of the side sill rear piece 240 interposed vehicle-widthwise between the crossing member 220 and the coupling separator CS.

<Workings and Effects>

As described, in the vehicle body frame structure F according to this embodiment, the frame structure of the front part of the vehicle and the frame structure of the rear part of the vehicle may be coupled at the frame couplings FC, to constitute a rigid frame. In the following, with reference to FIGS. 4 to 6, the workings of the frame couplings FC are described.

As the vehicle travels, in the vehicle body frame structure F, loads in a torsional direction, a vehicle vertical direction, etc. are transmitted to the structural members such as the front side frames 200 because of vibrations transmitted from, for example, the wheels 10, unillustrated suspensions, and the power unit 20.

Figure 6:
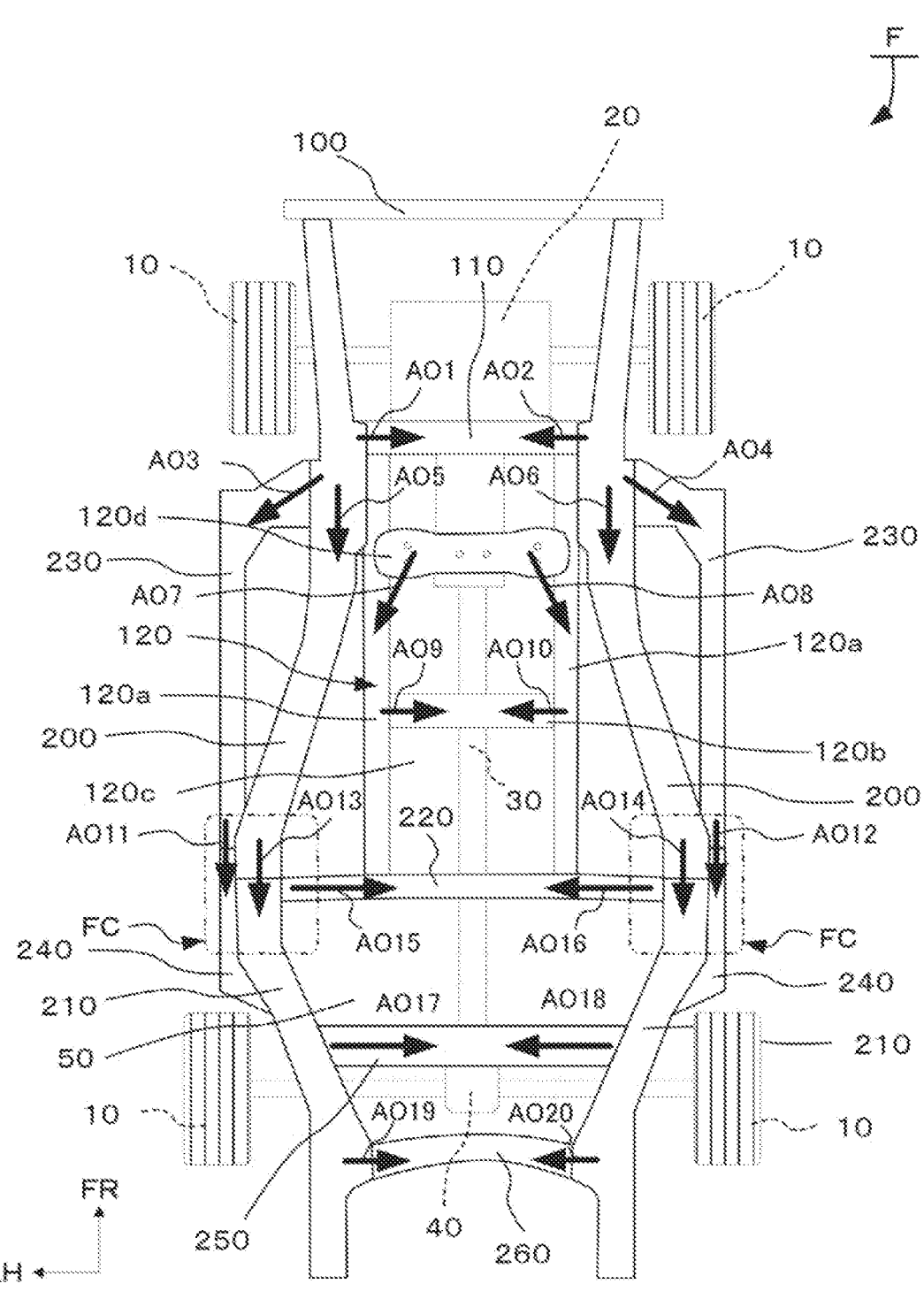
FIG. 6 is a structural diagram illustrating loads to be transmitted to the vehicle body frame structure in FIG. 2.

As illustrated in FIG. 6, for example, loads caused by vibrations, etc. transmitted from the wheels 10 in the front part of the vehicle are distributed and transmitted to the torque box 110 and the side sill front pieces 230 through the front side frames 200, as denoted by arrows AO1 to AO6. Moreover, loads caused by torsion, vibration, etc. transmitted from the power unit 20 are distributed and transmitted to the floor tunnel 120 through the floor cross-piece 120*d*, as denoted by arrows AO7 to AO10. Furthermore, loads transmitted from the front side frames 200 and the side sill front pieces 230 are transmitted to the frame couplings FC, as denoted by arrows AO11 to AO14.

In the meanwhile, as illustrated in FIG. 4, at the frame couplings FC, the front side frames 200 and the rear side frames 210 are provided and coupled linearly in the segment denoted by the arrow C. Moreover, the side sill front pieces 230 and the side sill rear pieces 240 are provided and coupled linearly in the segment denoted by the arrow C. Thus, the loads transmitted from the front side frames 200 are transmitted to the rear side frames 210 without loss. Moreover, the loads transmitted from the side sill front pieces 230 are transmitted to the side sill rear pieces 240 without loss.

Moreover, at the frame couplings FC, the front side frames 200, the rear side frames 210, the crossing member 220, the side sill front pieces 230, and the side sill rear pieces 240 that constitute the frame of the vehicle body frame structure F are rigidly coupled to one another. Furthermore, inside the side sill rear pieces 240, the coupling separators CS as the stiffening members may be disposed to extend the crossing member 220 vehicle-widthwise outwardly. The coupling separators CS may include, for example, a steel plate. The coupling separators CS may be rigidly coupled to the rear side frames 210 and the crossing member 220, with the side sill rear pieces 240 in between.

In one example, at the couplings CP1 to CP3, the front side frames 200, the rear side frames 210, the crossing member 220, the side sill front pieces 230, the side sill rear pieces 240, and the coupling separators CS are rigidly coupled to one another.

For example, as illustrated in FIGS. 4 and 5, at the couplings CP1*a* of the couplings CP1, the side sill front pieces 230 and the side sill rear pieces 240 may be coupled by, for example, welding in the two-layer stack. At the couplings CP1*b*, the front side frames 200, the side sill front pieces 230, and the side sill rear pieces 240 may be coupled by, for example, welding in the three-layer stack. At the couplings CP1*c*, the front side frames 200 and the side sill front pieces 230 may be coupled by, for example, welding in the two-layer stack. Moreover, at the couplings CP1*b* and CP1*c*, the front side frames 200 are coupled to the side sill front pieces 230 and the side sill rear pieces 240, to overlap with the vehicle-downward sides of the side sill front pieces 230 and the side sill rear pieces 240. The front side frames 200 stiffen the couplings CP1 between the side sill front pieces 230 and the side sill rear pieces 240.

At the couplings CP2, the front side frames 200 and the rear side frames 210 are coupled linearly. At the couplings CP2*a*, the front side frames 200 and the rear side frames 210 may be coupled by, for example, welding in the two-layer stack. At the couplings CP2*b*, the front side frames 200, the rear side frames 210, and the side sill rear pieces 240 are coupled by, for example, welding in the three-layer stack. At the couplings CP2*b*, the front side frames 200 and the rear side frames 210 are coupled to the side sill rear pieces 240, to overlap with the vehicle-downward sides of the side sill rear pieces 240. The side sill rear pieces 240 stiffen the couplings CP2 between the front side frames 200 and the side sill front pieces 230. Moreover, the couplings CP2 are provided at the positions shifted to rearward of the couplings CP1 in the vehicle longitudinal direction.

At the couplings CP3, the rear side frames 210, the crossing member 220, the side sill rear pieces 240, and the coupling separators CS disposed inside the side sill rear pieces 240 are coupled. At the couplings CP3*a*, the crossing member 220 and the side sill rear pieces 240 may be coupled by, for example, welding in the two-layer stack. At the couplings CP3*b*, the rear side frames 210, the side sill rear pieces 240, and the coupling separators CS may be coupled in the three-layer stack. The coupling separators CS may be coupled to the crossing member 220, with the side sill rear pieces 240 in between, to stiffen the couplings CP3 between the crossing member 220 and the side sill rear pieces 240.

As described, at the frame couplings FC, the front side frames 200, the rear side frames 210, the crossing member 220, the side sill front pieces 230, and the side sill rear pieces 240 that constitute the frame of the vehicle body frame structure F are rigidly coupled to one another. Thus, as illustrated in FIG. 6, the loads transmitted from the front side frames 200 and the side sill front pieces 230 are distributed to the rear side frames 210, the crossing member 220, and the side sill rear pieces 240, as denoted by the arrows AO11 to AO16. Moreover, the rear crossing members 250 and 260 may be coupled to the rear side frames 210 in the rear part of the vehicle. Thus, the loads transmitted to the rear side frames 210 are distributed to the rear crossing members 250 and 260, as denoted by arrows AO17 to AO20.

In the meanwhile, the vehicle body frame structure F is installed mainly in an underfloor space, but, for example, a battery to be used in an electric vehicle is often accommodated in the underfloor space. This renders it necessary to provide the vehicle body frame structure F that allows for a large underfloor space while providing adequate rigidity of the vehicle.

As illustrated in FIG. 4, the side sill front pieces 230 and the side sill rear pieces 240 are provided on vehicle-widthwise either side. The front side frames 200 may be provided aslant vehicle-widthwise outwardly as extends from the vehicle-widthwise outer sides of the floor tunnel 120 toward the rear part of the vehicle. Moreover, the rear side frames 210 are disposed vehicle-widthwise inwardly of the side sill rear pieces 240. Thus, it is desirable to enlarge a vehicle-widthwise inner underfloor space sandwiched between the front side frames 200 and the side sill rear pieces 240 disposed on vehicle-widthwise either side.

In the segment denoted by the arrow C, the front side frames 200 and the rear side frames 210 are coupled linearly, making it possible to bring the front side frames 200 and the rear side frames 210 into close contact with the side sill front pieces 230 and the side sill rear pieces 240. Moreover, the front side frames 200 and the rear side frames 210 are coupled to the side sill front pieces 230 and the side sill rear pieces 240, to overlap with the side sill front pieces 230 and the side sill rear pieces 240 disposed on vehicle-widthwise either side. Thus, the front side frames 200 and the rear side frames 210 are shifted vehicle-widthwise outwardly.

Moreover, at the couplings CP1 to CP3, the coupling in the three-layer stack leads to reduction in area for the coupling. Furthermore, the coupling separators CS as the stiffening members may be disposed inside the side sill rear pieces 240. This prevents the coupling separators CS from occupying any area for the coupling.

As described, the vehicle body frame structure F according to this embodiment includes the side sill front pieces 230, the side sill rear pieces 240, the front side frames 200, and the rear side frames 210. The side sill front pieces 230 extend in the vehicle longitudinal direction and are provided on vehicle-widthwise either side of the bottom of the vehicle. The side sill rear pieces 240 extend in the vehicle longitudinal direction. The vehicle-frontward ends of the side sill rear pieces 240 are coupled to the vehicle-rearward ends of the side sill front pieces 230. The front side frames 200 extend in the vehicle longitudinal direction from the vehicle-frontward ends of the side sill front pieces. The front side frames 200 are provided on vehicle-widthwise either side and vehicle-widthwise inwardly of the side sill front pieces 230. The rear side frames 210 extend in the vehicle longitudinal direction. The vehicle-frontward ends of the rear side frames 210 are coupled to the vehicle-rearward ends of the front side frames 200. The side sill front pieces 230 and the side sill rear pieces 240 are coupled linearly at the couplings CP1 as the first couplings while extending in the vehicle longitudinal direction. The front side frames 200 and the rear side frames 210 are coupled linearly at the couplings CP2 as the second couplings while extending in the vehicle longitudinal direction. The couplings CP2 are provided rearward of the couplings CP1 in the vehicle longitudinal direction. The front side frames 200 are coupled, at the couplings CP1, to the side sill front pieces 230 and the side sill rear pieces 240, to overlap with the side sill front pieces 230 and the side sill rear pieces 240.

At the couplings CP1, the side sill front pieces 230 and the side sill rear pieces 240 are coupled linearly while extending in the vehicle longitudinal direction. At the couplings CP2, the front side frames 200 and the rear side frames 210 are coupled linearly while extending in the vehicle longitudinal direction.

That is, it is possible to dispose, on vehicle-widthwise either side, the side sill front pieces 230, the side sill rear pieces 240, the front side frames 200, and the rear side frames 210 that extend in the vehicle longitudinal direction. Hence, in the vehicle body frame structure F, it is possible to keep a large vehicle-widthwise inner underfloor space.

In the meanwhile, the couplings CP2 are provided rearward of the couplings CP1 in the vehicle longitudinal direction. Moreover, the front side frames 200 are coupled, at the couplings CP1, to the side sill front pieces 230 and the side sill rear pieces 240, to overlap with the side sill front pieces 230 and the side sill rear pieces 240.

In other words, the vehicle-longitudinal deviation between the couplings CP1 and the couplings CP2 makes it possible to distribute the loads such as the vibration and the torsion transmitted from the vehicle V. Moreover, at the couplings CP1, the coupling of the front side frames 200 to the side sill front pieces 230 and the side sill rear pieces 240 makes it possible to enhance the rigidity of the couplings CP1.

Hence, it is possible to enhance the rigidity of the vehicle body while providing an adequate underfloor space.

Moreover, the vehicle body frame structure F according to this embodiment may further include the crossing member 220 and the coupling separators CS. The crossing member 220 may be disposed in the longitudinally middle part of the vehicle and extend in the vehicle widthwise direction. The coupling separators CS may be disposed inside the side sill rear pieces 240 at the couplings CP3 as the third couplings at which the crossing member 220 and the side sill rear pieces 240 are coupled. The coupling separators CS may be coupled to the side sill rear pieces 240, the rear side frames 210, and the crossing member 220.

That is, because the coupling separators CS may be disposed inside the side sill rear pieces 240, the coupling separators CS do not occupy any area for the coupling, making it possible to maintain an adequate underfloor space. Moreover, the coupling separators CS are stiffening members including, for example, a steel plate, and it is possible to allow the coupling separators CS to be lightweight. Furthermore, the coupling separators CS may be coupled to the rear side frames 210, the crossing member 220, and the side sill rear pieces 240. This makes it possible to extend the crossing member 220 vehicle-widthwise outwardly, and rigidly couple the rear side frames 210, the crossing member 220, and the side sill rear pieces 240. Hence, it is possible for the vehicle body frame structure F to distribute the loads such as the vibration and the torsion transmitted from the vehicle V, to each of the constituent members. Moreover, in the vehicle body frame structure F, distributing the loads to each of the constituent members makes it possible to reduce the concentration of the loads on each of the constituent members.

Hence, it is possible to enhance the rigidity of the vehicle body rigidity without adding a heavy stiffening member, while providing an adequate underfloor space.

Moreover, in the vehicle body frame structure F according to this embodiment, the side sill rear pieces 240 may be coupled at the couplings CP1*b* as the fourth couplings to the side sill front pieces 230 and the front side frames 200 in the three-layer stack. The side sill rear pieces 240 may be coupled at the couplings CP2*b* as the fifth couplings to the front side frames 200 and the rear side frames 210 in the three-layer stack. The side sill rear pieces 240 may be coupled at the couplings CP3*b* as the sixth couplings to the rear side frames 210 and the coupling separators CS in the three-layer stack.

In other words, coupling the members that constitute the frame in the three-layer stack makes it possible to reduce a space for the coupling and reduce the number of places for welding. Moreover, it is possible to provide rigid coupling of the members that constitute the frame, namely, the side sill front pieces 230, the front side frames 200, and the rear side frames 210, around the side sill rear pieces 240 as a core. Accordingly, it is possible for the vehicle body frame structure F to distribute the loads such as the vibration and the torsion transmitted from the vehicle V, to each of the constituent members.

Hence, it is possible to enhance the rigidity of the vehicle body while providing an adequate underfloor space.

In the forgoing embodiment of the disclosure, an example is given in which the coupling separators CS are coupled to the side sill rear pieces 240. However, the coupling separators CS may be unitized with the vehicle-frontward ends of the side sill rear pieces 240.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The invention claimed is:

1. A vehicle body frame structure for a vehicle, the vehicle body frame structure comprising:

side sill front pieces extending in a vehicle longitudinal direction of the vehicle and provided on vehicle-width-wise either side of a bottom of the vehicle;

side sill rear pieces extending in the vehicle longitudinal direction, vehicle-frontward ends of the side sill rear pieces being coupled to respective vehicle-rearward ends of the side sill front pieces;

front side frames extending in the vehicle longitudinal direction from respective vehicle-frontward ends of the side sill front pieces, the front side frames being provided on vehicle-widthwise either side and vehicle-widthwise inwardly of the side sill front pieces; and rear side frames extending in the vehicle longitudinal direction, vehicle-frontward ends of the rear side frames being coupled to respective vehicle-rearward ends of the front side frames, wherein the side sill front pieces and the side sill rear pieces are coupled linearly at first couplings while extending in the vehicle longitudinal direction, and the front side frames and the rear side frames are coupled linearly at second couplings while extending in the vehicle longitudinal direction, the second couplings being provided rearward of the first couplings in the vehicle longitudinal direction, and the front side frames are coupled, at the first couplings, to the side sill front pieces and the side sill rear pieces, to overlap with the side sill front pieces and the side sill rear pieces.

2. The vehicle body frame structure according to claim 1, further comprising:

a crossing member disposed in a longitudinally middle part of the vehicle and extending in a vehicle widthwise direction of the vehicle; and coupling separators disposed inside the side sill rear pieces at third couplings at which the crossing member and the side sill rear pieces are coupled, wherein the coupling separators are coupled to the side sill rear pieces, the rear side frames, and the crossing member.

3. The vehicle body frame structure according to claim 2, wherein the side sill rear pieces are coupled at fourth couplings to the side sill front pieces and the front side frames in a three-layer stack, coupled at fifth couplings to the front side frames and the rear side frames in a three-layer stack, and coupled at sixth couplings to the rear side frames and the coupling separators in a three-layer stack.

\* \* \* \* \*